(12) United States Patent
Schievelbusch

(10) Patent No.: US 7,195,209 B2
(45) Date of Patent: Mar. 27, 2007

(54) AIRCRAFT HIGH-LIFT SYSTEM WITH OVERLOAD PROTECTION

(75) Inventor: Bernd Schievelbusch, Lindenberg (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 0 days.

(21) Appl. No.: 10/788,160

(22) Filed: Feb. 26, 2004

(65) Prior Publication Data

US 2004/0251382 A1 Dec. 16, 2004

(30) Foreign Application Priority Data

Feb. 26, 2003 (DE) ................. 103 08 301

(51) Int. Cl.
*B64C 3/50* (2006.01)

(52) U.S. Cl. ......................... 244/215; 60/431

(58) Field of Classification Search .............. 244/75 R, 244/76 R, 213, 90 R, 215; 60/431, 432
See application file for complete search history.

(56) References Cited

U.S. PATENT DOCUMENTS

| | | | |
|---|---|---|---|
| 4,575,027 A | | 3/1986 | Cronin |
| 4,745,815 A | * | 5/1988 | Klopfenstein ............... 74/89.25 |
| 4,786,013 A | * | 11/1988 | Pohl ......................... 244/75 R |
| 4,858,491 A | * | 8/1989 | Shube ....................... 74/665 B |
| 5,409,188 A | * | 4/1995 | Takagi et al. ............... 244/195 |
| 6,616,096 B1 | * | 9/2003 | Witton et al. ............. 244/75 R |

FOREIGN PATENT DOCUMENTS

| | | |
|---|---|---|
| DE | 3800647 | 7/1989 |
| EP | 1065487 | 1/2001 |
| WO | WO2004/008097 | 1/2004 |

OTHER PUBLICATIONS htt://www.omega.com/literature/transactions/volume3/load3.html, "Load Cell Designs".*
http://www.omega.com/literature/transactions/volume3/load3.html, "Load Cell Designs".*

* cited by examiner

*Primary Examiner*—Timothy D. Collins
(74) *Attorney, Agent, or Firm*—Dilworth & Barrese LLP

(57) ABSTRACT

The invention concerns an aircraft high-lift system with a drive system, components for transmitting the drive energy over the entire wing span to drive stations of individual segments of landing flap/slat flap systems, and with overload protection. According to the invention, the overload protection consists of electrical load sensors positioned at the drive-energy in-take points of the individual power trains on the flaps.

19 Claims, 1 Drawing Sheet

AIRCRAFT HIGH-LIFT SYSTEM WITH OVERLOAD PROTECTION

BACKGROUND OF THE INVENTION

The invention concerns an aircraft high-lift system with overload protection and having a drive system, and components for transmitting the drive energy over the entire wing span to drive stations of individual segments of landing flap/slat flap systems.

Aircraft high-lift systems with central drive systems for aircraft landing flaps already exist. In these systems the drive energy is distributed by means of rotary shaft systems over the full wing span to corresponding drive stations of the individual segments of the landing flap system or the slat flap system. If an individual segment is blocked, this segment has to take up the full drive energy of the central drive as reaction energy, and accordingly it has to be large and heavy.

Mechanical torque limiters are therefore installed as protective devices on each drive station. These mechanical torque limiters divert the drive energy to the wing structure whenever a specified overload occurs, so that the blocking flap is not damaged. As a consequence of the lagging of the drive unit, the shaft train between the drive unit and the blocking point is loaded with maximum driving torque. The error is determined by a mechanical indicator (if there is one) that must be located visually by the maintenance personnel. Additionally, the operating readiness of the mechanical torque limiter can be checked only by testing. Furthermore, the equipment must be removed from the aircraft. Arrangements of this type with mechanical distribution of drive energy by means of rotary shafts are common in all types of aircraft.

SUMMARY OF THE INVENTION

The task of the within invention is to achieve improved protection of the aircraft structural elements against unacceptable overload in case of locking, with less overall load on the individual components of the drive train in the event of locking.

According to the invention, the performance of this task starts with an aircraft high-lift system through the combination with the characteristics of the overload protection being composed of electrical load sensors positioned at the drive-energy intake points of each power train on the flaps.

Accordingly, the mechanical torque limiters at the drive intake of the workstations are replaced by electrical load sensors at the point of transmission of the drive energy from the train to the flaps.

Complicated mechanical torque limiters can thereby be eliminated, which represents weight and cost savings compared to the previously existing systems. Additionally, the electrical signal facilitates immediate location of problems. Because the sensor is behind the individual drive station train, fluctuations in the degree of gear efficiency in the measuring chain are eliminated. This improves measurement accuracy considerably. The electronic monitoring of the sensors allows system readiness to be verified at any time and without complicated maintenance work or dismantling of the system. Lastly, the principle of compensation facilitates the gear ratio changes determined by the kinematics of the flap track.

Preferred embodiments of the invention result from the disclosure herein.

Accordingly, the drive unit can have an electronic control that is connected with the load sensors, and by means of which an electrical load signal can be fed to the drive system when a load in excess of a tolerance limit is absorbed, so that the drive energy is reduced and the system is in torque equilibrium. In this way there is considerably less load on the drive train components when the system locks, and the components can be lighter compared to existing aircraft high-lift systems.

Advantageously, the drive system/drive unit acts with rapid adjustment of the drive performance. Examples include hydraulic motors with adjustable displacement volumes and brushless direct-current motors.

The individual load sensors can consist of at least one extension measuring tape positioned inside a hollow pin, which said sensors are designed in standard bridge arrangement. The pin thrust expansion caused by shear load is thus measurable as a change in the bridge resistance. This type of sensor construction can advantageously be designed as hermetically sealed bodies, so that increased resistance to environmental influences can be achieved.

In another variant embodiment, the load sensor is an in-line installed load cell. This load cell can work on the principle of piezo-resistive voltage change and also on the principle of magneto-resistive voltage change through load.

It is especially advantageous for aviation applications if all measuring arrangements are designed as temperature-compensated arrangements, in order to take into account the heavy demands of an aircraft environment.

As a general rule, each segment of the aircraft high-lift flap system is operated by two drive stations. Each drive station bears a portion of the flap loads that is determined by the geometry of the power contacts of air load and driving forces defined. If the flow of energy is interrupted in one of the drive stations, for example by breakage of a component or loss of connection components (a "disconnect"), no more power is sent through the load-sensor-equipped pin. According to one preferred embodiment of the invention, the monitor can thereby recognize an unacceptable change in power ratios and can send the necessary information to the crew, or can trigger the programmed emergency reactions of the drive system.

The same observation and evaluation of the power ratios can be used for error recognition, if because of a skewing of the flap the center of the air forces is shifted and consequently there is a change in the load-bearing portions of the drive trains.

BRIEF DESCRIPTION OF THE DRAWINGS

Other details and advantages of the invention are explained in greater detail by means of the embodiments illustrated in the drawing, which shows.

DESCRIPTION OF THE PREFERRED EMBODIMENTS

Figure 1:
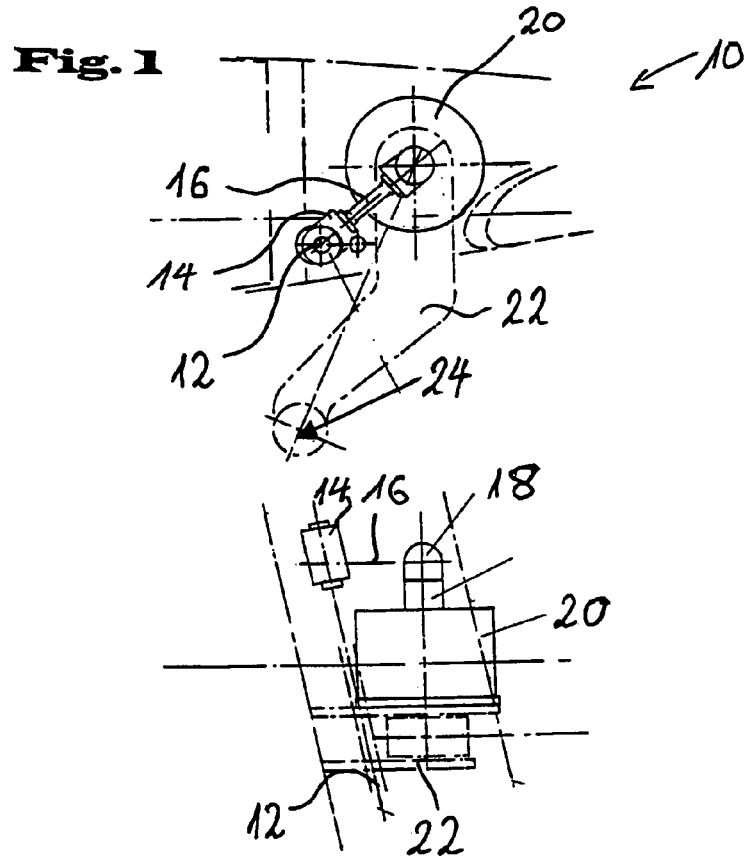
FIG. 1: A side view and a top view of a portion of a drive system according to a first embodiment of the invention.

The embodiment illustrated in FIG. 1 is a typical flap drive station 10 with rotary drive.

The drive energy is conducted from a central drive shaft 12 via a branch drive 14 to a branch propeller shaft 16. An angular gear 18 forces the drive energy into a step-down gear 20 that operates a lever 22 on the power take-off side.

A pin 24 with an integrated load sensor, not illustrated here in greater detail, connects lever 22, in a manner not illustrated here in greater detail, with the drive kinematics of the flap to be operated.

Figure 2:
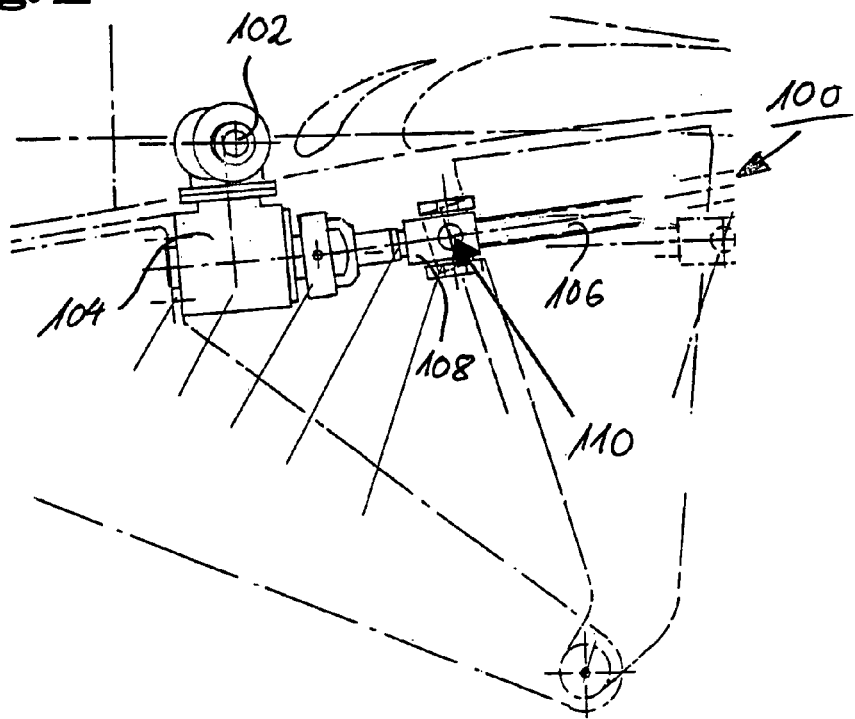
FIG. 2: A side view of a drive system according to a second embodiment of the within invention.

FIG. 2 shows a second variant embodiment for a typical flap drive station with linear train 100. A ball castor shaft for example can be used as a linear drive. Here the drive energy is derived from a central drive-shaft 102 to a step-down gear 104. On the out-put side the step-down gear 104 drives a stem 106. By means of stem nut 108 the rotary movement is transformed into a linear movement. A pin 110 with an integrated load sensor according to the invention connects the stem nut 108 with the corresponding drive kinematics of the flap, not illustrated here in greater detail.

The invention claimed is:

1. Aircraft high-lift system with
   a drive system,
   components for transmitting the drive energy over the entire wing span to drive stations with linear power trains of individual segments of leading edge or trailing edge high-lift devices, and with overload protection,
   wherein the overload protection comprises electrical load sensors positioned at the drive-energy intake points of each power train on flaps, and directly connected to the drive system and the power trains of the individual segments of the high-lift devices.

2. Aircraft high-lift system according to claim 1, wherein the drive unit has an electronic control that is connected with the load sensors and by which an electrical load signal can be sent to the drive system when a load exceeding a tolerance limit is absorbed, so that the drive energy is reduced and the system can be maintained smoothly in torque equilibrium.

3. Aircraft high-lift system according to claim 1, wherein the drive system includes drive units with adjustment of the drive power.

4. Aircraft high-lift system according to claim 1, wherein the load sensor comprises at least one extension measuring tape positioned inside a hollow pin in standard bridge arrangement.

5. Aircraft high-lift system according to claim 1, wherein the load sensor comprises a load cell.

6. Aircraft high-lift system according to claim 1, wherein by the overload protection, the skewing of a flap and/or the interruption of the flow of energy to the drive of a flap can be determined.

7. Aircraft high-lift system according to claim 2, wherein the drive system includes hydraulic engines with adjustable brushless direct-current motors.

8. Aircraft high-lift system according to claim 7, wherein the load sensor comprises at least one extension measuring tape positioned inside a hollow pin in standard bridge arrangement.

9. Aircraft high-lift system according to claim 2, wherein the load sensor comprises at least one extension measuring tape positioned inside a hollow pin in standard bridge arrangement.

10. Aircraft high-lift system according to claim 3, wherein the load sensor comprises at least one extension measuring tape positioned inside a hollow pin in standard bridge arrangement.

11. Aircraft high-lift system according to claim 10, wherein the load sensor comprises a load cell.

12. Aircraft high-lift system according to claim 2, wherein the load sensor comprises a load cell.

13. Aircraft high-lift system according to claim 3, wherein the load sensor comprises a load cell.

14. Aircraft high-lift system according to claim 4, wherein the load sensor comprises a load cell.

15. Aircraft high-lift system comprising:
    a drive system,
    components for transmitting the drive energy over the entire wing span to drive stations with linear power trains of individual segments of leading edge or trailing edge high-lift devices, and with overload protection,
    wherein the overload protection comprises electrical load sensors positioned at the drive-energy intake points of each power train on flaps, and
    said electrical load sensors are constituted by a pin (24) having an integrated load sensor and being mounted to couple a lever (22) of the drive station (10) with power train of the respective flap to be operated.

16. Aircraft high-lift system according to claim 15, wherein the drive station (10) additionally comprises
    a rotary drive,
    a central drive shaft (12) coupled to the rotary drive,
    a branch propeller shaft (16),
    a branch drive (14) mounted to conduct drive energy from the rotary shaft (12) to the propeller shaft (16),
    a step-down gear (20) arranged to operate the lever (22) on a power take-off side, and
    an angular gear (18) arranged upon the propeller shaft (16) to force the drive energy into the step-down gear (20).

17. Aircraft high-lift system comprising:
    a drive system,
    components for transmitting the drive energy over the entire wing span to drive stations with linear power trains of individual segments of leading edge or trailing edge high-lift devices, and with overload protection,
    wherein the overload protection comprises electrical load sensors positioned at the drive-energy intake points of each power train on flaps, and
    said electrical load sensors are constituted by a pin (110) having an integrated load sensor and being mounted to couple a stem nut (108), in turn mounted about a stem (106) of the linear power train (100), with drive kinematics of the respective flap to be operated.

18. Aircraft high-lift system according to claim 17, wherein the drive station having the linear power train (100) comprises
    a ball castor shaft as linear drive,
    a central drive shaft (102) coupled to the ball castor shaft, and
    a step down gear (104) coupled to the central drive shaft (102) to derive the drive energy therefrom,
    said stem (106) coupled to an output side of said step down gear (104).

19. Aircraft high-lift system according to claim 3, wherein the drive units include hydraulic engines with adjustable brushless direct-current motors.

* * * * *